US011022478B2

(12) United States Patent
Benner et al.

(10) Patent No.: US 11,022,478 B2
(45) Date of Patent: Jun. 1, 2021

(54) PASSIVE MAGNETIC POSITION SENSOR

(71) Applicant: Continental Automotive GmbH, Hannover (DE)

(72) Inventors: Hans-Guenter Benner, Kriftel (DE); Matthias Kadler, Ruesselsheim (DE); Torsten Barz, Hanau-Mittelbuchen (DE)

(73) Assignee: Vitesco Technologies GmbH, Hannover (DE)

( * ) Notice: Subject to any disclaimer, the term of this patent is extended or adjusted under 35 U.S.C. 154(b) by 254 days.

(21) Appl. No.: 16/316,524

(22) PCT Filed: Jul. 12, 2017

(86) PCT No.: PCT/EP2017/067479
§ 371 (c)(1),
(2) Date: Jan. 9, 2019

(87) PCT Pub. No.: WO2018/015232
PCT Pub. Date: Jan. 25, 2018

(65) Prior Publication Data
US 2019/0293475 A1    Sep. 26, 2019

(30) Foreign Application Priority Data
Jul. 22, 2016  (DE) ............... 10 2016 213 514.7

(51) Int. Cl.
*G01F 23/38* (2006.01)
*G01F 23/46* (2006.01)
*G01F 23/62* (2006.01)

(52) U.S. Cl.
CPC .............. *G01F 23/38* (2013.01); *G01F 23/46* (2013.01); *G01F 23/62* (2013.01)

(58) Field of Classification Search
CPC ....... G01D 5/165; G01F 23/363; G01F 23/36; G01F 23/38
See application file for complete search history.

(56) References Cited

U.S. PATENT DOCUMENTS 3,106,694 A   10/1963  De Giers et al.
4,532,491 A *  7/1985  Rau .................... G01F 23/36
                                                    338/33
(Continued)

FOREIGN PATENT DOCUMENTS

CN    203 148 528 U    8/2013
CN    203148528 U      8/2013
(Continued)

OTHER PUBLICATIONS

Machine Translation of DE 102010040421 A1 Which Originally Published on Mar. 8, 2012. (Year: 2012).*
(Continued)

*Primary Examiner* — David A. Rogers
(74) *Attorney, Agent, or Firm* — Cozen O'Connor

(57) ABSTRACT

A filling level indicator for determining a filling level in a tank includes: a resistor network; a contact element arranged spaced apart from the resistor network; and a magnetic element movable relative to the resistor network and the contact element. The contact element has a contact region deflectable by the magnetic element. The contact region is deflectable so as to produce an electrically conductive connection between the contact region and the resistor network. The contact region comprises a planar tape-shaped element that is partially deflectable by a magnetic force of the magnetic element. The contact region has at least two portions that are arranged mutually adjacent to, and mutually spaced apart from, one another.

12 Claims, 3 Drawing Sheets

(56) References Cited

U.S. PATENT DOCUMENTS

| | | | | |
|---|---|---|---|---|
| 4,637,254 A * | 1/1987 | Dyben | ............... | G01F 23/76 |
| | | | | 340/624 |
| 5,621,318 A * | 4/1997 | Jacobsen | ............ | G01B 7/003 |
| | | | | 318/568.16 |
| 5,798,640 A * | 8/1998 | Gier | ..................... | G01D 5/18 |
| | | | | 324/207.22 |
| 5,969,594 A * | 10/1999 | Gier | ..................... | F16F 1/025 |
| | | | | 180/41 |
| 6,070,337 A * | 6/2000 | Wallrafen | ............ | G01B 7/003 |
| | | | | 324/207.11 |
| 6,401,533 B1 | 6/2002 | Gier et al. | | |
| 6,518,873 B1 * | 2/2003 | O'Regan | ............ | G01F 23/36 |
| | | | | 338/162 |
| 6,688,171 B2 * | 2/2004 | Kramp | ............ | G01F 23/68 |
| | | | | 73/314 |
| 6,803,759 B2 * | 10/2004 | Eck | ............ | G01D 5/2515 |
| | | | | 324/207.24 |
| 6,886,403 B2 * | 5/2005 | LaBarge | ............ | G01F 23/363 |
| | | | | 73/304 C |
| 7,091,819 B1 * | 8/2006 | Forgue | ............ | H01C 10/32 |
| | | | | 338/162 |
| 7,209,028 B2 * | 4/2007 | Boronkay | ............ | G01D 5/165 |
| | | | | 324/714 |
| 7,251,999 B2 * | 8/2007 | Benner | ............ | G01F 23/363 |
| | | | | 116/229 |
| 7,513,153 B2 * | 4/2009 | Benner | ............ | G01F 23/363 |
| | | | | 73/290 R |
| 8,179,125 B2 | 5/2012 | Benner et al. | | |
| 8,646,329 B2 * | 2/2014 | Mattmann | ............ | G01F 23/38 |
| | | | | 73/290 R |
| 2003/0037612 A1 * | 2/2003 | Nagakura | ............ | G01F 23/36 |
| | | | | 73/313 |
| 2004/0130319 A1 * | 7/2004 | Eck | ............ | G01D 5/2515 |
| | | | | 324/207.24 |
| 2005/0040929 A1 * | 2/2005 | Dedert | ............ | H01C 10/305 |
| | | | | 338/160 |
| 2006/0042377 A1 * | 3/2006 | Nakagawa | ............ | G01F 23/36 |
| | | | | 73/304 R |
| 2006/0176143 A1 * | 8/2006 | Ebnet | ............ | H01C 10/32 |
| | | | | 338/68 |
| 2006/0191334 A1 * | 8/2006 | Benner | ............ | G01F 23/363 |
| | | | | 73/313 |
| 2007/0006647 A1 * | 1/2007 | Benner | ............ | G01F 23/363 |
| | | | | 73/305 |
| 2007/0152658 A1 * | 7/2007 | Pauer | ............ | G01D 5/165 |
| | | | | 324/207.13 |
| 2010/0207610 A1 * | 8/2010 | Benner | ............ | G01D 5/251 |
| | | | | 324/207.13 |
| 2010/0263443 A1 * | 10/2010 | Mattmann | ............ | G01D 5/165 |
| | | | | 73/290 R |
| 2011/0101966 A1 * | 5/2011 | Dengler | ............ | G01D 5/165 |
| | | | | 324/207.13 |
| 2011/0109463 A1 * | 5/2011 | Fukuhara | ............ | G01F 23/363 |
| | | | | 340/603 |
| 2014/0326065 A1 * | 11/2014 | Benner | ............ | G01L 1/2287 |
| | | | | 73/296 |
| 2015/0300869 A1 * | 10/2015 | Klein | ............ | G01F 23/363 |
| | | | | 73/317 |
| 2015/0338264 A1 | 11/2015 | Briggs et al. | | |
| 2016/0258805 A1 * | 9/2016 | Mattmann | ............ | G01F 23/36 |
| 2016/0327424 A1 * | 11/2016 | Miyagawa | ............ | G01F 23/363 |
| 2017/0322065 A1 * | 11/2017 | Hashimoto | ............ | G01F 23/38 |
| 2019/0242740 A1 * | 8/2019 | Benner | ............ | G01F 23/62 |

FOREIGN PATENT DOCUMENTS

| | | | | |
|---|---|---|---|---|
| CN | 203274861 | | 11/2013 | |
| CN | 203274861 U | * | 11/2013 | ............ G01F 23/60 |
| DE | 4309442 | | 9/1994 | |
| DE | 19701246 A1 | | 7/1998 | |
| DE | 198 19 047 A1 | | 9/1999 | |
| DE | 4335004 C2 | * | 4/2000 | ............ G01B 7/02 |
| DE | 10200011231 | | 12/2000 | |
| DE | 10200867 A1 | * | 7/2003 | ............ G01F 23/68 |
| DE | 102004039853 A1 | * | 3/2006 | ............ G01D 5/2515 |
| DE | 10 2005 047 542 A1 | | 5/2007 | |
| DE | 102007023530 A1 | * | 11/2008 | ............ G01D 5/165 |
| DE | 102008007399 A1 | * | 8/2009 | ............ G01D 5/2525 |
| DE | 10 2009 013 533 A1 | | 9/2010 | |
| DE | 10 2009 025 458 A1 | | 1/2011 | |
| DE | 102010040421 A1 | * | 3/2012 | ............ H01G 11/06 |
| DE | 102016213510 B4 | * | 5/2019 | ............ G01D 5/2515 |
| EP | 1491771 A1 | | 12/2004 | |
| JP | H10-223413 | | 8/1998 | |
| JP | 3072654 B2 | | 7/2000 | |
| JP | 2001-508546 | | 6/2001 | |
| JP | 2004-125497 | | 4/2004 | |
| JP | 2006-267087 | | 10/2006 | |
| WO | WO-2005071360 A1 | * | 8/2005 | ............ G01F 23/363 |
| WO | WO 2009/106381 | | 9/2009 | |
| WO | WO 2015 185 265 A1 | | 12/2015 | |
| WO | WO-2018015299 A1 | * | 1/2018 | ............ G01F 23/72 |

OTHER PUBLICATIONS

Machine Translation of DE 102007023530 A1 Which Originally Published on Nov. 20, 2008. (Year: 2008).*

Office Action dated Nov. 3, 2020 issued in Chinese Patent Application No. 201780037828.6.

Office Action dated Oct. 19, 2020 issued in Korean Patent Application No. 10-2019-7005109.

Office Action dated Nov. 17, 2020 issued in India Patent Application No. 201837046958.

* cited by examiner

PASSIVE MAGNETIC POSITION SENSOR

CROSS-REFERENCE TO RELATED APPLICATIONS

This is a U.S. national stage of application No. PCT/EP2017/067479 filed on 12 Jul. 2017, which claims priority to the Germany Application No. 10 2016 213 514.7 filed 22 Jul. 2016, and the content of all incorporated herein by reference.

BACKGROUND OF THE INVENTION

1. Field of the Invention

The invention relates to a filling level indicator for determining a filling level in a tank.

2. Related Art

Filling level indicators for determining the filling level in a fuel tank have a resistor network which generates a signal as a function of the actual filling level, which signal corresponds to the filling level in the fuel tank. For this purpose, a float is typically provided, which floats on the surface of the fuel in the fuel tank and acts on the resistor network by a linkage and a sliding contact. The movement of the float, as a result of a rising or falling filling level, is transmitted via the linkage to the sliding contact, which is moved past the resistor network as a result of the movement. Here, a varying signal is generated as a function of the position of the sliding contact. By standardizing the signal and by configuring the resistor network in a specific way it is possible to infer the filling level in the fuel tank directly from the signal generated at the resistor network. Such filling level indicators are known in a wide variety of forms in the prior art.

Moreover, filling level indicators are known which, instead of a sliding contact, have a contact element having a multiplicity of finger-like portions, which are deflectable by a magnetic force such that electrical contact is generated between the finger-like portion and a resistor network. A signal is generated as a result of the generation of the electrical contact. By the generated signal, it is possible to infer the filling level in the fuel tank directly as a function of the configuration of the resistor network and of the contact element. Such a filling level indicator is known, for example, from DE 197 01 246 A1.

A disadvantage of the devices in the prior art is in particular that the sliding contact on the resistor network constitutes a mechanical contact, which is subject to inevitable wear. Furthermore, the sliding contact and the resistor network are in this case disposed entirely in the fuel within the fuel tank, which can result in damaging effects caused by the fuel. The generation of the electrical contact by a contact element having a multiplicity of finger-like portions deflectable by a magnet is disadvantageous, because the contact element is highly sensitive to mechanical disturbance influences, which, in particular, renders the assembly and transportation of the contact elements difficult.

SUMMARY OF THE INVENTION

An object of the present invention is therefore to achieve a filling level indicator which has a mechanically more durable contact element and which, at the same time, permits wear-free generation of an ideally accurate signal which is dependent on the filling level in the fuel tank.

One exemplary embodiment of the invention relates to a filling level indicator for determining a filling level in a tank, having a resistor network, having a contact element, and having a magnetic element, wherein the contact element is disposed so as to be spaced apart from the resistor network and the magnetic element is movable relative to the resistor network and the contact element, wherein the contact element has a contact region which is deflectable by the magnetic element, wherein an electrically conductive connection between the contact region and the resistor network is capable of being produced by a deflection of the contact region, wherein the contact region is formed by a planar tape-shaped element, which is partially deflectable by the magnetic force of the magnetic element, wherein the contact region has at least two portions that are disposed so as to be mutually adjacent and mutually spaced apart.

The contact element is advantageously connected to a first electric potential. The resistor network is connected to a second electric potential that is dissimilar to the first electric potential. An electric circuit can be closed by way of contact between the contact element and the resistor network, on account of which a signal is generated. The resistor network has a plurality of contact faces, which have, in each case a specific ohmic resistance. A signal having a specific electric resistance is thus generated, depending on which contact face is contacted by the contact element. The signals of a specific resistance can then be assigned to a filling level. This is possible since the electric contact between the contact element and the resistor network is generated by the magnet that is connected to a lever arm and a float linked to the lever arm, on account of which the magnet is moved depending on the position of the float.

The contact element in one advantageous embodiment is disposed so as to be electrically isolated from the resistor network so as to be adjacent to the resistor network. The resistor network can be disposed on a carrier substrate, for example. The contact element for the purpose of linking preferably has a linking region. The linking region has openings or clearances, for example, which permit durable linking to the carrier substrate and/or the resistor network. The contact element furthermore has a contact region that is flexible and that can be independently deflected from the linking region out of the initial position of the contact element. The contact region is disposed above the resistor network such that a deflection of the contact element, or of the contact region of the contact element, respectively, is performed by passing the magnet along that side of the resistor network that faces away from the contact element such that physical contact is established between the contact region and the resistor network.

The contact region has at least two portions that can run so as to be mutually parallel and be deflected in a mutually independent manner, for example. The two portions can be deflected by a common magnet such that a redundancy is generated in practical terms. In the event of one portion being destroyed, the respective other portion can thus continue to generate a correct signal, for example. The signals generated as a result of the closing of an electric circuit between a portion and the resistor network can also be compared with one another so as to verify the trueness of the signals. To this end, a dedicated resistor network can be assigned to each of the portions, in order for individual signals to be able to be generated in each case and for a comparison to be able to be carried out.

The contact element herein is advantageously a planar tape element, which in the non-deflected state is aligned so as to be substantially in one plane. The tape-shaped contact element is deflected from the initial position and attracted in the direction of the resistor network by the magnet. A partial deformation of the contact element, or of a portion of the contact region, respectively, arises herein. The flexibility of the portions of the contact region is designed such that the distance between the portions and the resistor network can be bridged by the deflection, on the one hand, and that only a defined delimited region of the respective portion is deflected that far that an electric contact is established with one of the contact faces of the resistor network, on the other hand. In one advantageous embodiment the portions of the contact region can also be configured such that a plurality of contact faces that are beside one another and directly mutually adjacent are simultaneously contacted on account of the deflection.

It is particularly advantageous for the portions of the contact region to be connected to one another in an electrically conductive manner. On account of an electrically conductive connection of the portions to one another it can be ensured that both portions are connected to the same electric potential. In the event of the failure of one portion, the signal of the respective other portion is therefore at least maintained.

In one alternative embodiment it is advantageous for the portions of the contact region to be connected in an electrically conducting manner to the same electric potential. This is advantageous for the fail-safe operation to be guaranteed. Since the portions are linked to the same electric potential, the portions, when in contact with the resistor network, also generate in each case the same signals. Redundant signals are thus generated, which is why the absence of an individual signal can also be compensated for without consequences by one of the portions.

It is also preferable for the portions of the contact region to be free of clearances and/or penetrations. A contact region, or individual defined portions of the contact region, respectively, which are free of clearances and/or penetrations are particularly advantageous since the production is particularly simple. On account thereof, the contact region, or the portions, respectively, moreover has/have very high ruggedness during manufacturing and transportation. Also, no highly accurate matching between the contact region, or the portions, respectively, and the resistor network has to be carried out during the assembly, since the entire area of the contact region, or of the portions, respectively, can be used for generating an electric contact.

It is furthermore expedient for the contact element, or the portions, respectively, to be made of plastic, or for the contact element to be formed from metal. Insofar as the contact element is formed from plastic, a metallic coating is applied to that side that faces the resistor network. Elements which are capable of being particularly easily attracted by a magnetic force can advantageously also be provided on a contact element from plastic.

It is moreover advantageous for the mutually spaced apart portions of the contact region to be deflectable by a common magnet. This is advantageous since it is thus ensured that all portions are uniformly attracted, depending on the respective position of the magnet. This helps toward guaranteeing the generation of a redundant signal.

It is furthermore advantageous for an electrically conductive contact to be capable of being established between the portions of the contact region and contact faces of a resistor network. This is required for an electric signal, which permits an indication relating to the filling level in the tank, to be generated.

It is also expedient for each of the portions of the contact region to be assigned a dedicated resistor network, wherein an electrically conductive contact between a portion and the assigned resistor network is capable of being established by a deflection of the respective portion. This is advantageous in order to generate a higher reliability in terms of a failure of the filling level indicator. The two independent resistor networks can be connected to the same electric potential, or to mutually dissimilar electric potentials.

It is moreover advantageous for the portions of the contact region to be generated by subdividing the contact region along the direction of movement of the magnetic element. The magnetic element, which is preferably a permanent magnet, by way of the movement of the lever arm to which the float is also fastened, is moved in an arcuate path, since the lever arm is mounted so as to be rotatable about a fixed rotation axis. On account of the profile of the separation along the arcuate path it is achieved that the portions can likewise run along the arcuate path and thus can extend along the arcuate path across the entire resistor network. The portions can thus be brought into contact with the contact faces on a first end region of the resistor network as well as on a second end region of the resistor network, the second end region preferably being disposed on the opposite end of the resistor network.

It is furthermore expedient for the contact element to be formed by a plurality of planar tape-shaped metal strips. This facilitates a particularly simple configuration of the contact element. The individual tape-shaped metal strips are preferably configured so as to be flat and arcuate such that the metal strips can follow the motion path of the magnet.

It is moreover advantageous for the contact region and/or the portions of the contact region to have the shape of an arcuate segment, wherein the extent of the arcuate segment in the axial direction is substantially smaller than the extent of the arcuate segment in the radial direction and smaller than the extent of the arcuate segment in the circumferential direction.

An arcuate segment is particularly advantageous since the lever arm used for determining the filling level is mounted so as to be rotatable about a rotation axis. The magnet is either connected directly to the lever arm, or is at least moved by the lever arm. Consequently, the path along which the magnet is moved in a rotation of the lever arm about the rotation axis likewise describes an arc. To ensure that the magnet is at all times guided so as to have an approximately consistent spacing from the resistor network and the contact element, a configuration as an arcuate segment is therefore advantageous.

The radial direction runs from the center of the associated circle of the arcuate segment toward the external circumference. The circumferential direction runs along the circumference of the circle associated with the arcuate segment, and the axial direction runs along a surface normal which lies on the plane defined by the associated circle.

A particularly thin contact element, or a particularly thin contact region, respectively, results on account of a configuration having a very minor extent in the axial direction and a larger extent in the radial direction, and an even substantially larger extent in the circumferential direction. The extent in the radial direction is ideally so large that the contact region completely covers the contact faces of the resistor network. In one alternative embodiment the extent in the radial direction can, however, also be less than the extent of the contact faces in the radial direction.

One preferred embodiment is distinguished by a particularly minor extent in the radial direction and in the axial direction. The contact element, or the contact region, respectively, here is configured as a wire-shaped element. The cross section can be configured so as to be round or angular, for example.

In the case of a plurality of portions of the contact region it is particularly advantageous for each individual portion to have the shape of an arcuate segment. Advantageously, the resistor network, and in particular the contact faces of the resistor network, likewise have the shape of an arcuate segment.

It is also expedient for the resistor network to have a plurality of contact faces, which are disposed so as to be mutually adjacent, wherein the generation of an electrically conductive contact between the contact region and a first contact face generates a signal that reflects a maximum filling level in the tank, and the generation of an electrically conductive contact between the contact region and a second contact face generates a signal which reflects a minimum filling level in the tank.

The detection of the filling level can be detected across the entire spectrum from completely empty to fully filled on account of such a construction of the resistor network and of the contact element. The position of the float varies so as to depend on the filling level, the float being connected to the magnet by way of a lever arm. The position of the magnet is thus also changed on account of the positional modification of the float, on account of which the contact element is brought into an electrically conducting contact with different contact faces. An indication relating to the filling level can be also made on account thereof, when the generated signals, presently in particular the specific resistance values, are accurately assigned, in relation to the position of the magnet.

It is furthermore advantageous for the first contact face to be configured on a first end region of the resistor network, and the second contact face to be configured on a second end region of the resistor network, wherein the first end region and the second end region are disposed on mutually opposite ends of the resistor network.

This is advantageous in order for successively all filling levels, from the maximum filling level of the tank to the minimum filling level, or an empty tank, respectively, to be able to be represented by way of the respective resistor network. For example, the maximum filling level corresponds to a particularly high specific electric resistance, while an empty tank corresponds to a particularly low specific electric resistance. A step-by-step determination of the filling level can thus be performed by a suitable grading of the specific electric resistances of the contact faces. The more contact faces are provided, the more accurately the filling level can be determined, or the finer the resolution can be performed.

It is also preferable for the portions of the contact region to be, in each case, capable of being brought into an electrically conductive contact with both the first contact face as well as with the second contact face of the resistor network. This is required to be able to represent the entire filling level from the maximum filling level, corresponding to a full tank, to the minimum filling level, corresponding to an empty tank, by way of an individual portion of the contact region. Each portion of the contact region can thus individually reproduce the respective filling level in the tank. A redundancy can thus be generated across a plurality of portions that are disposed so as to be mutually parallel.

BRIEF DESCRIPTION OF THE DRAWINGS

The invention will be discussed in detail below with respect to exemplary embodiments, with reference to the drawings. In the drawings.

DETAILED DESCRIPTION OF THE PRESENTLY PREFERRED EMBODIMENTS

Figure 1A:
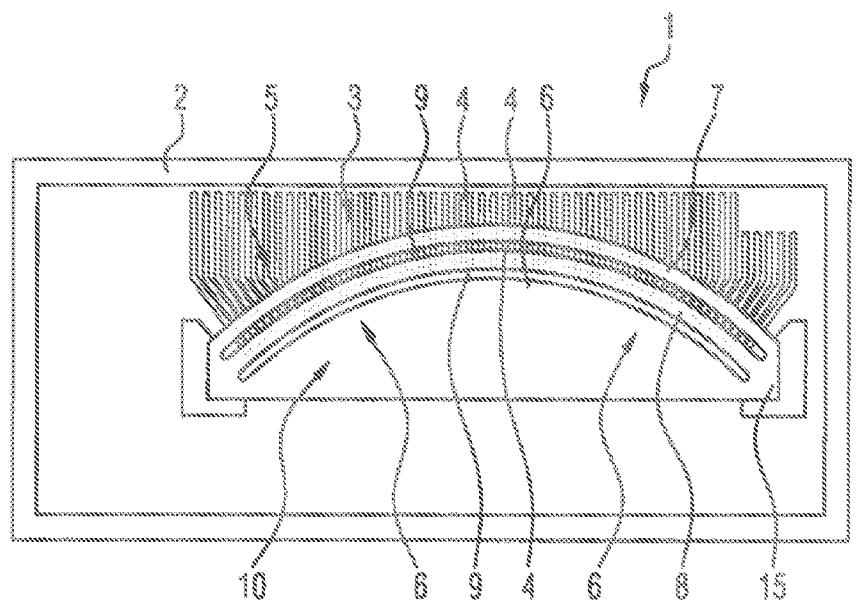
FIGS. 1A and 1B show plan and side views, respectively, of a filling level indicator, wherein the contact element has a contact region which by way of clearances that run in an arcuate manner is subdivided into two portions.
Figure 1B:
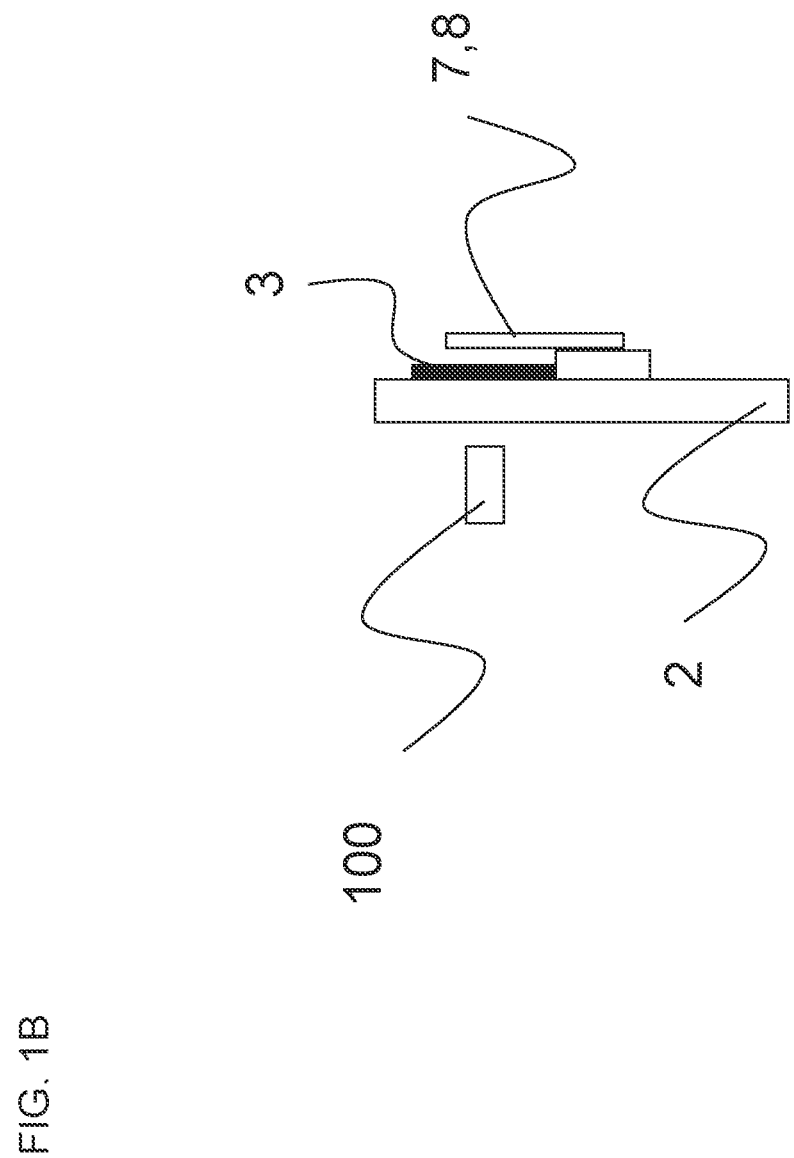

FIG. 1A shows a plan view of a filling level indicator 1. FIG. 1B shows a side view of the filling level indicator 1. The filling level indicator 1 has a substrate 2 having a resistor network 3 disposed thereon. It can be seen in FIG. 2 that the individual contact faces 4 all have an individual construction mode, on account of which the individual contact faces 4 in each case have a specific electric resistance that is unique within the resistor network 3. It is thus possible for a measured electric resistance to be assigned to one of the contact faces 4 at all times.

The contact element 5 is disposed above the resistor network 3. The contact element 5 on the left and the right end sides is linked to linking regions 15 on spacer elements, and is thus spaced apart from the resistor network 3. The contact element 5 has a contact region 6. The contact region 6 herein covers the resistor network 3 lying therebelow in such a manner that an electrically conductive contact to the contact faces 4 is capable of being established by way of a downward deflection of the contact region 6 as far as the resistor network 3. A limited region of the contact region 6 is in each case deflected, depending on the position of the magnet 100 below the substrate 2.

The contact region 6 has two portions 7 and 8 which are mutually separated by clearances 9 in the contact element 5 that run in an arcuate manner. The arcuate clearances 9 run along the direction of movement of the magnet 100. The portions 7 and 8 can be deflected in a mutually independent manner in the direction toward the resistor network 3. Whether one portion 7 or 8 is deflected, or both portions 7 and 8 are simultaneously deflected, depends on the size and positioning of the magnet 100. Insofar as the magnet 100 is configured in a correspondingly wide manner and/or has a correspondingly strong magnetic force, the magnet 100 can deflect the portions 7 and 8 individually or simultaneously.

The magnet 100 in one advantageous embodiment is configured so as to be pin-shaped and is guided both below the portion 7 as well as the portion 8 such that the two portions 7 and 8 are in each case brought into contact with the same contact faces 4 of the resistor network 3. An identical signal having the identical specific electric resistance is thus generated in each case by both portions 7 and 8. A redundancy that could compensate for the damage to a portion 7 or 8 by way of the respective other portion 7 or 8, for example, is thus generated.

The two portions 7 and 8 in the exemplary embodiment of FIGS. 1A and 1B are connected to the same electric potential. Likewise, also only one common resistor network 3 is disposed below the portions 7 and 8. In one advantageous inventive refinement, electrically mutually separated and independent resistor networks can also be disposed below the portions, wherein one of the portions can in each case be brought into an electrically conductive connection to one of the resistor networks. Such an arrangement would enable a mutually independent measurement. This can advantageously be used for carrying out a direct inspection of the trueness of the generated signals. In the case of an identical electric potential on the portions and in the case of identical specific resistance values of the resistor networks and of the contact faces thereof, the same signal should be generated by both systems at a specific position of the magnet 100. Deviations in a system could thus be detected, and a potentially erroneous display can be corrected.

The peripheral region 10 of the contact element 5 shown in FIGS. 1A and 1B can be provided for enhancing the stability of the contact element 5. However, the illustration in FIGS. 1A and 1B illustrate only one exemplary advantageous design embodiment of the filling level indicator.

Figure 2:
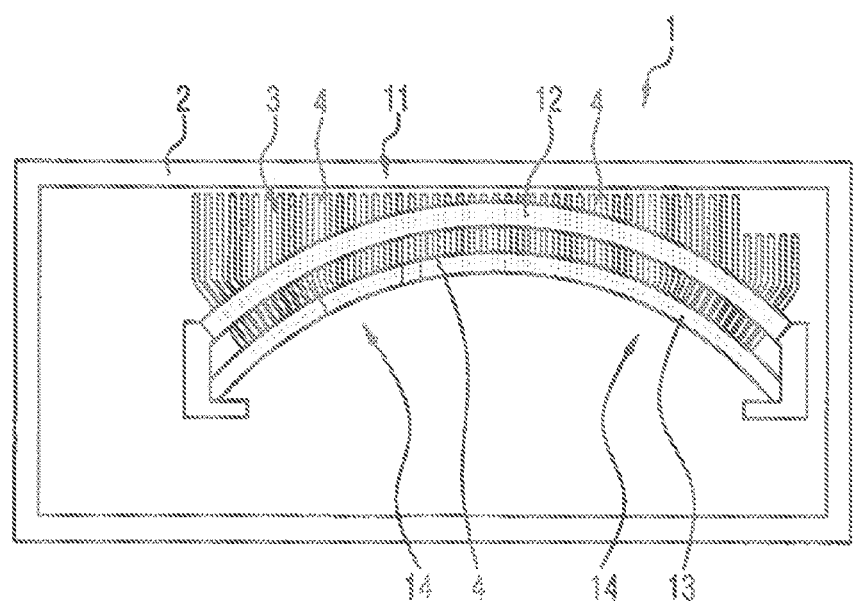
FIG. 2 shows a plan view of a filling level indicator, wherein the contact region is formed from two arcuate elements, wherein each of the arcuate elements represents one portion of the contact region.

FIG. 2 shows a filling level indicator 1 that has in particular a contact element 11 that is configured in a deviating manner. The substrate 2 and the resistor network 3 having the contact faces 4 thereof are identical to the elements of FIGS. 1A and 1B, which is why identical reference signs are also used.

The contact element 11 has two individual strips 12 and 13, which have an arcuate shape. The radius followed by the arcuate strips 12, 13 mimics the shaping of the resistor network 3, and in particular the arrangement of the contact faces 4. The strips 12, 13 configure the contact region 14 of the contact element 11.

The two strips 12, 13 form the portions of the contact region of the contact element 11. The two portions 12, 13 are received on the end sides in linking regions and are spaced apart from the resistor network 3 by spacer elements, for example. The portions 12, 13 can be connected to the same electric potential, or to mutually dissimilar electric potentials. In this case, the portions 12, 13 are disposed so as to be electrically mutually isolated.

The resistor network 3 can be a single resistor network 3, as has already been described in FIGS. 1A and 1B, or be formed by two mutually independent resistor networks.

FIGS. 1 and 2 show exemplary images of a filling level indicator according to the invention. The figures have no limiting character and do not restrict the scope of the solution, in particular in terms of the selection of materials, the geometry, and the arrangement. The individual features illustrated in the figures and the features described herein can also be combined in a manner that deviates from that of the figures, without departing from the core concept of the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level indicator (1) for determining a filling level in a tank, comprising:
   a resistor network (3);
   a contact element (5, 11) arranged spaced apart from the resistor network (3); and
   a magnetic element movable relative to the resistor network (3) and the contact element (5, 11),
   wherein:
      the contact element (5, 11) has a contact region (6, 14) deflectable by the magnetic element,
      the contact region (6, 14) is deflectable so as to produce an electrically conductive connection between the contact region (6, 14) and the resistor network (3),
      the contact region (6, 14) comprises a planar tape-shaped element that is partially deflectable by a magnetic force of the magnetic element, and
      the contact region (6, 14) has at least two portions (7, 8, 12, 13) that are arranged mutually adjacent to, and mutually spaced apart from, one another,
      wherein the contact region (6, 14) and the at least two portions (7, 8, 12, 13) of the contact region (6, 14) are mutually separated by at least one clearance (9) shaped as an arcuate segment, wherein an axial extent of the arcuate segment is smaller than a radial extent of the arcuate segment and smaller than a circumferential extent of the arcuate segment.

2. The filling level indicator (1) as claimed in claim 1, wherein the at least two portions (7, 8, 12, 13) of the contact region (6, 14) are connected to one another in an electrically conductive manner.

3. The filling level indicator (1) as claimed in claim 1, wherein the at least two portions (7, 8, 12, 13) of the contact region (6, 14) are connected in an electrically conducting manner to a common electric potential.

4. The filling level indicator (1) as claimed in claim 1, wherein the at least two portions (7, 8, 12, 13) of the contact region (6, 14) are free of clearances and/or penetrations.

5. The filling level indicator (1) as claimed in claim 1, wherein the at least two portions (7, 8, 12, 13) of the contact region (6, 14) are deflectable by a common magnet.

6. The filling level indicator (1) as claimed in claim 1, wherein the at least two portions (7, 8, 12, 13) of the contact region (6, 14) and contact faces (4) of the resistor network (3) are electrically conductively contactable with one another.

7. The filling level indicator (1) as claimed in claim 1, wherein each of the at least two portions (7, 8, 12, 13) of the contact region (6, 14) is assigned a dedicated resistor network (3), wherein, by a deflection of a respective at least one portion (7, 8, 12, 13), the at least one portion of the at least two portions (7, 8, 12, 13) and the assigned resistor network (3) is electrically conductively contactable.

8. The filling level indicator (1) as claimed in claim 1, wherein the at least two portions (7, 8, 12, 13) of the contact region (6, 14) comprise a subdivision of the contact region (6, 14) along a direction of movement of the magnetic element.

9. The filling level indicator (1) as claimed in claim 1, wherein the contact element (5, 11) comprises a plurality of planar tape-shaped metal strips (12, 13).

10. The filling level indicator (1) as claimed in claim 1, wherein the resistor network (3) has a plurality of contact faces (4) arranged so as to be mutually adjacent, wherein an electrically conductive contact between the contact region (6, 14) and a first one of the first contact faces (4) generates a signal that reflects a maximum filling level in the tank, and an electrically conductive contact between the contact region (6, 14) and a second one of the contact faces (4) generates a signal that reflects a minimum filling level in the tank.

11. The filling level indicator (1) as claimed in claim 10, wherein the first one of the first contact faces (4) is arranged on a first end region of the resistor network (3), and the second one of the first contact faces (4) is arranged on a second end region of the resistor network (3), wherein the first end region and the second end region are arranged on mutually opposite ends of the resistor network (3).

12. The filling level indicator (1) as claimed in claim 11, wherein the at least two portions (7, 8, 12, 13) of the contact region (6, 14) are, in each case, electrically conductively contactable with both the first one of the first contact faces (4) and the second one of the first contact faces (4) of the resistor network (3).

\* \* \* \* \*